Nov. 22, 1955   S. G. CANTACUZENE ET AL   2,724,527
PNEUMATIC-HYDRAULIC COMPENSATOR AND METHOD
Filed Sept. 8, 1950   5 Sheets-Sheet 1
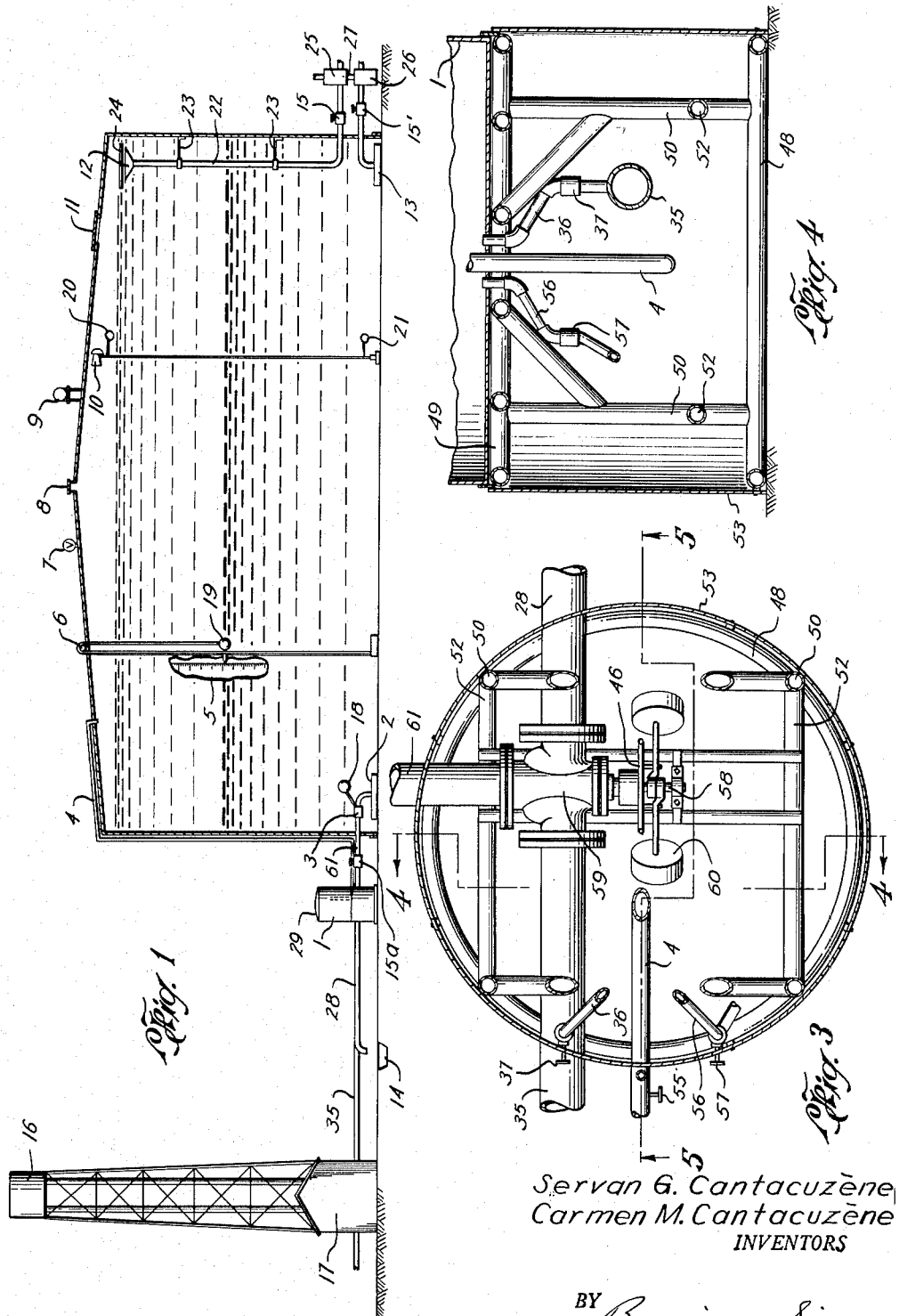
Servan G. Cantacuzène
Carmen M. Cantacuzène
INVENTORS
BY *Browning & Simms*
ATTORNEYS

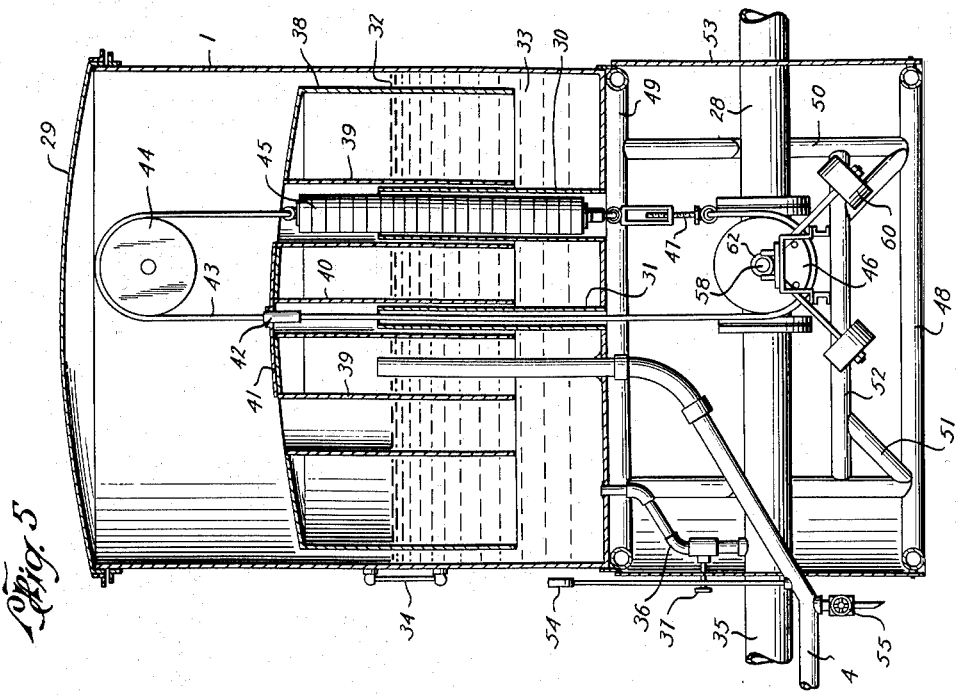
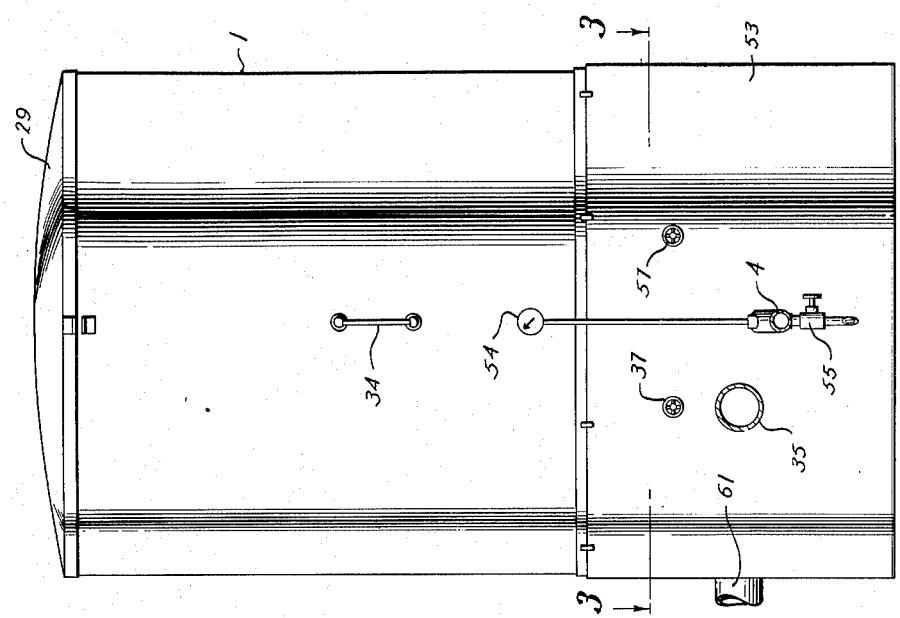

Nov. 22, 1955   S. G. CANTACUZENE ET AL   2,724,527
PNEUMATIC-HYDRAULIC COMPENSATOR AND METHOD
Filed Sept. 8, 1950   5 Sheets-Sheet 3
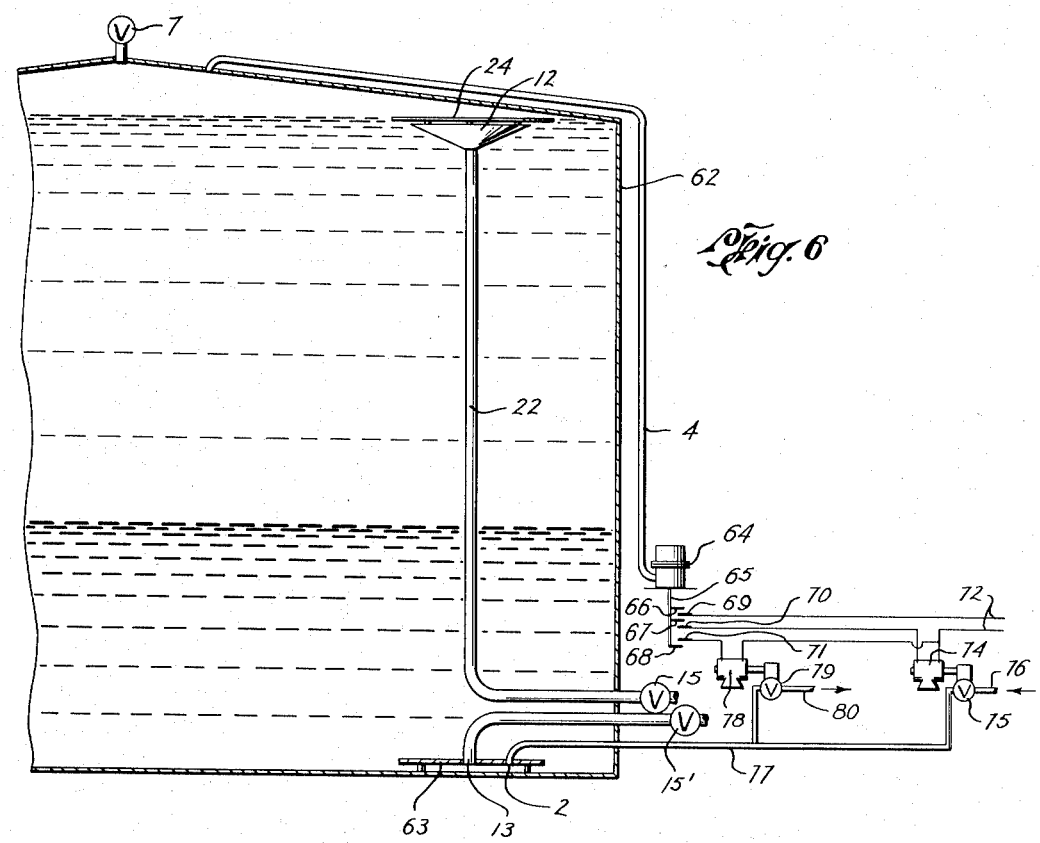
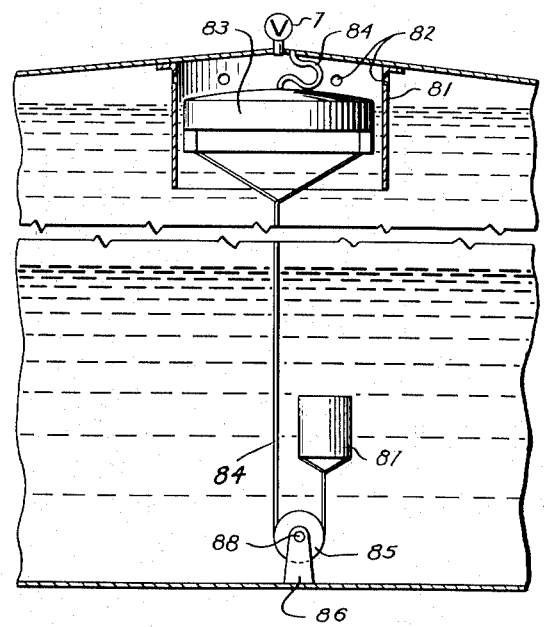
Servan G. Cantacuzène
Carmen M. Cantacuzène
INVENTORS
BY
ATTORNEYS Nov. 22, 1955    S. G. CANTACUZENE ET AL    2,724,527
PNEUMATIC-HYDRAULIC COMPENSATOR AND METHOD
Filed Sept. 8, 1950    5 Sheets-Sheet 4
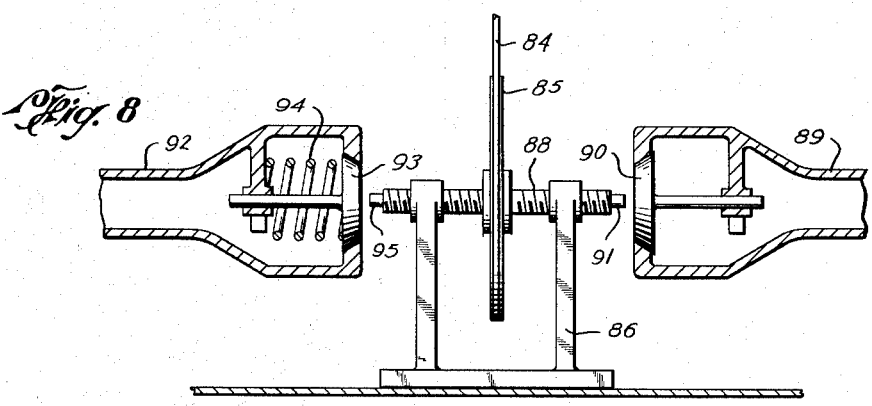
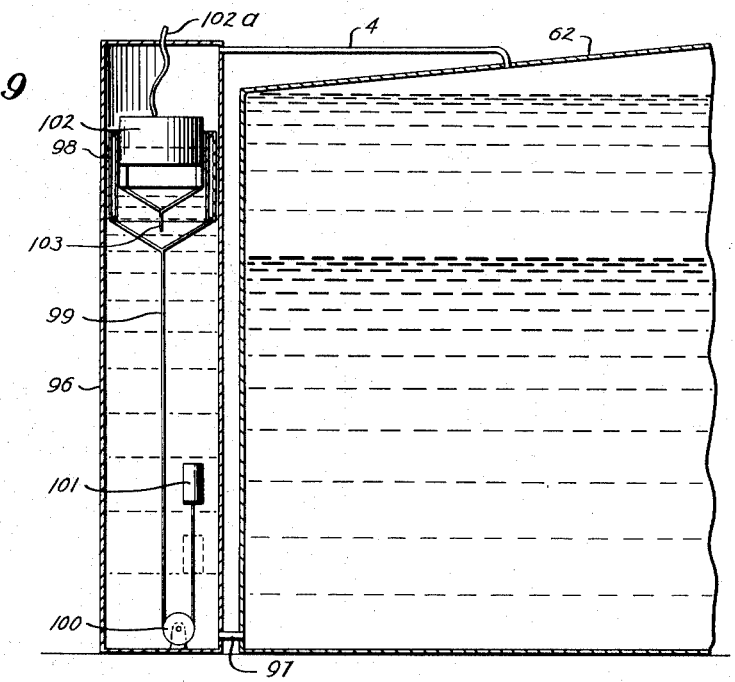
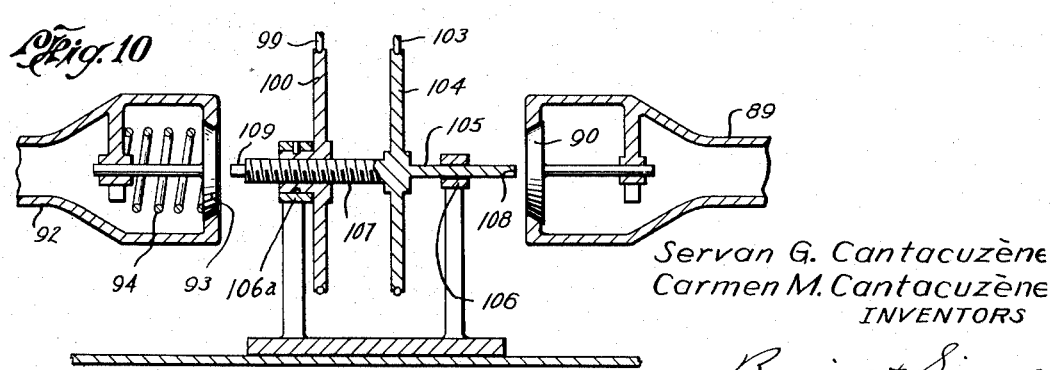
Servan G. Cantacuzène
Carmen M. Cantacuzène
INVENTORS
BY Browning & Simms
ATTORNEYS Nov. 22, 1955  S. G. CANTACUZENE ET AL  2,724,527
PNEUMATIC-HYDRAULIC COMPENSATOR AND METHOD
Filed Sept. 8, 1950  5 Sheets-Sheet 5
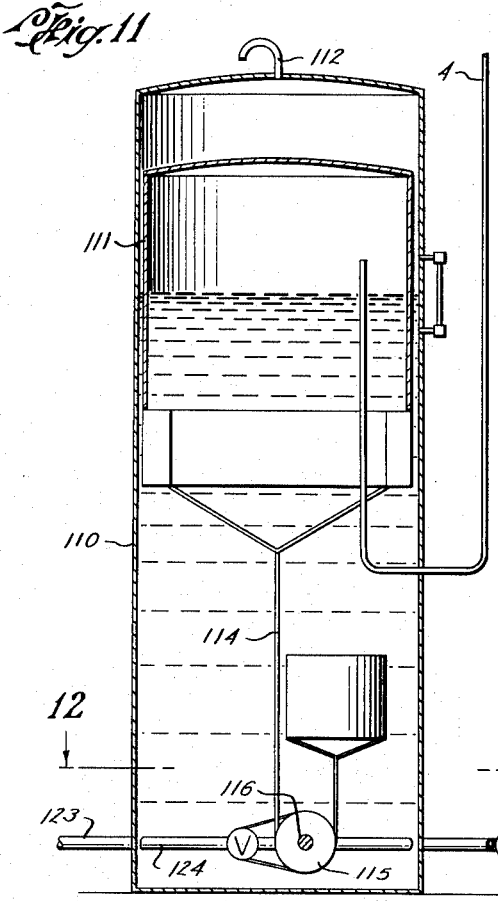
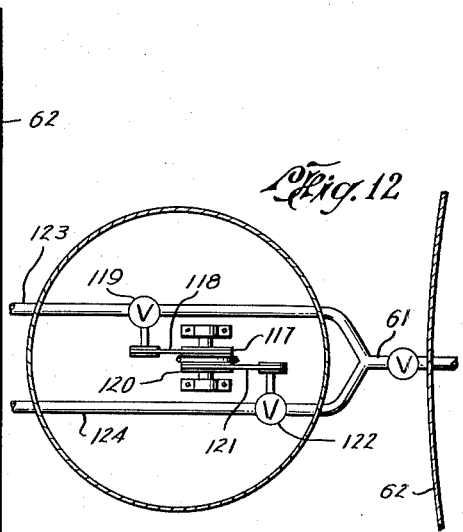
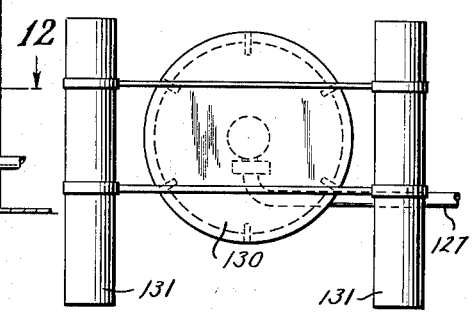
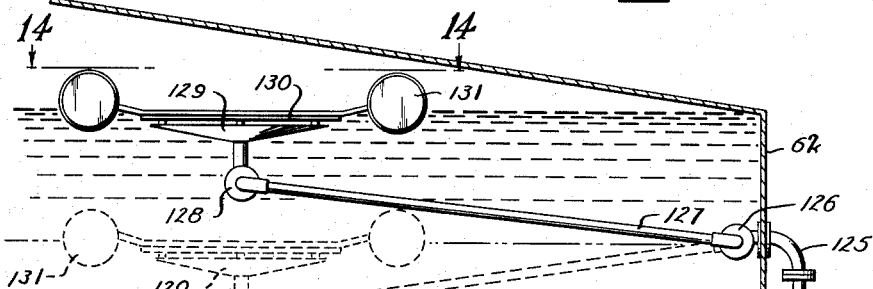
Servan G. Cantacuzène
Carmen M. Cantacuzène
INVENTORS
BY Browning + Simms.
ATTORNEYS

United States Patent Office 2,724,527
Patented Nov. 22, 1955

2,724,527

PNEUMATIC-HYDRAULIC COMPENSATOR AND METHOD

Servan G. Cantacuzene and Carmen M. Cantacuzene, Paris, France

Application September 8, 1950, Serial No. 183,882

12 Claims. (Cl. 222—52)

This invention relates in general to apparatus and method for use in connection with the storage of gasoline and other volatile liquids for the purpose of preventing losses of substantial fractions of such liquids due to evaporation.

It is well recognized that incalculable losses are incurred annually both during storage and during filling and emptying operations in connection particularly with the storage of gasoline and similar liquid products. These losses occur as a result of the fact that the vapor pressure of such liquids is so high that substantial evaporation of the liquids will take place into any gas space above them. During times of storage when no filling or emptying takes place, the pressure within such gas spaces above the liquid will increase during the hottest part of the day or under the direct rays of the sun on the tank, and in order to prevent excessive pressures it is necessary to provide for the venting of gas from the gas space during such periods. This naturally involves a loss of the vapors of the volatile product so vented. Then when the sun goes down or the tank for any reason becomes cooler, the pressure drops, and in order to prevent collapse of the tank roof it is necessary to provide for the intake of air from the outside. This air, being free from vapors of the stored liquid, makes possible further evaporation of the stored liquid into the gas space with a consequent loss the next time the tank is heated and gas is vented therefrom.

Much the same thing as above described takes place during the filling of a tank, during which time gas must be vented in order to make room for the incoming liquid, thereby losing the vapors in the gas vented, and when liquid is withdrawn from the tank air must be admitted, thereby creating a situation in which further evaporation will take place.

Various means have been proposed for reducing the losses above referred to, one of these being the provision of a floating roof on the storage tank and another being the provision of a flexible vessel connected with the gas space at the top of the storage tank so that the storage tank may "breathe" into and out of the flexible vessel. These have been successful to some extent in reducing vapor losses but are expensive to install and require putting existing tanks out of operation for a relatively long period of time during installation.

One of the known methods of reducing or preventing evaporation losses of volatile liquids, for example, gasoline, in storage tanks, consists in compensating the volume variations of the volatile liquid by opposite and equal volume variations of another liquid heavier than, or of greater specific gravity than and immiscible with the volatile liquid. In the case of the storage of gasoline such heavier liquid may be water or the like.

By thus maintaining automatically the upper level of the gasoline in contact with the tank's roof, one prevents evaporation. When filling or emptying the tank, gasoline is pumped in and water out, or vice versa, at the same rate.

Nevertheless, this method has two defects:

First, it is very difficult, when pumping, to obtain equal flow for the two liquids. Hence, even if the flow difference is small, the result is a difference in volume which is cumulative during the pumping period, and serves shortly to actuate one of the valves usually provided for relieving excessive pressure in the tank on the one hand, and for preventing excessive vacuum in the tank on the other hand.

Second, this method cannot be applied to tanks, other than flat roof tanks, unless their structure has been reinforced in order to resist the hydrostatic pressures that will inevitably be involved in the operation of such a system, the shell and roof of the usual storage tank being of insufficient strength to withstand such pressures.

One of the principal objects of this invention is to provide an apparatus and method for reducing or eliminating vapor losses in the storage of volatile liquids, employing the principle of hydraulic compensation in which variations in volume of the volatile liquid are compensated by equal and opposite variations in volume of a heavier liquid in the tank, in which the defect involved in inequalities in volume of the volatile liquid and the heavier liquid will be automatically compensated for.

Another object is to provide such an apparatus and method which may be applied to storage in existing tanks without necessity for substantial alteration or modification of their structure.

The principle involved in this invention consists in maintaining, while employing hydraulic compensation in the storage of volatile liquids, a space above the volatile liquid within the storage tank which is constantly filled with vapor, and in maintaining automatically a constant pressure within this vapor space, which pressure is preferably approximately the mid-point between the pressure to which the pressure relief valve customarily employed on such tanks is set to operate to relieve pressure from the interior of the tank, and the pressure to which the vacuum relief valve customarily employed on such tanks is set to admit atmospheric air into the tank. This is accomplished by the combination of two means, the one being a control means actuated by and subjected to the vapor pressure variations in the vapor or gas space above the body of stored volatile liquid, and the second being a means such as a valve arrangement controlled by the control means in such fashion as to cause water to flow from the tank when the pressure in the vapor space exceeds the predetermined value and to cause water to flow into the tank when the pressure in the vapor space falls below a predetermined value.

The employment of valves for this purpose requires that provision be made so that water may flow out of the tank to a level lower than the bottom of the tank under the influence of gravity, and that there be a water supply available under pressure sufficient to cause water to flow therefrom into the tank when required.

The control means exposed to and actuated by the pressure variations in the vapor space may be any known means adapted for this purpose such as a mercury or a membrane manometer employed for closing or opening an electric motor circuit or a pneumatic device such as hereinafter described. The valves controlling the flow of water may be of any known and appropriate type and the opening or closing of these valves may be by any suitable electric means such as an electric motor, or by mechanical connection directly with the pressure actuated control.

The necessary quantity of water involved is small. During storage this quantity equals the volume variations at constant pressure of the vapor in the tank. During pumping periods it corresponds to the output difference of the gasoline pump and the water pump.

Other objects and advantages of this invention will become apparent from the following description taken in connection with the accompanying drawings wherein are set forth certain embodiments of the invention, it being understood that these are by way of illustration and example only and not by way of limitation.

In the drawings:

Fig. 1 is a diagrammatic view illustrating a system of storage employing the method and apparatus in accordance with this invention, the storage tank being shown in vertical cross section for the purpose of illustrating certain apparatus contained therein;

Fig. 2 is a side elevation showing the exterior of a pressure actuated control such as illustrated in connection with the storage tank of Fig. 1;

Fig. 3 is a horizontal cross section taken along the line 3—3 of Fig. 2 and showing the valve mechanism and supporting structure as well as a portion of the pipe arrangement forming a part of the hydraulic compensator control mechanism;

Fig. 4 is a fragmentary vertical cross section through the lower portion of the structure shown in Fig. 2 taken along the line 4—4 of Fig. 3;

Fig. 5 is a vertical cross section through the structure shown in Fig. 2 taken along the line 5—5 of Fig. 3;

Fig. 6 is a view partly in vertical cross section through a storage tank and partly in diagrammatic form showing a modified form of control mechanism constructed in accordance with this invention and employing an electrical control;

Fig. 7 is a fragmentary vertical cross section through a portion of a storage tank showing a still further modification of a type of pressure actuated control employed within the storage tank;

Fig. 8 is a fragmentary vertical cross section through a valve mechanism for controlling the flow of water, the same being adapted to be actuated by the pressure actuated control illustrated in Fig. 7;

Fig. 9 is a view similar to Fig. 6 but illustrating a pressure actuated control located in a standpipe or vessel adjacent but separate from the main tank;

Fig. 10 is a view similar to Fig. 8 but illustrating a valve control mechanism adapted to be employed in connection with the structure shown in Fig. 9;

Fig. 11 is a view illustrating diagrammatically a modified form of pressure actuated control adapted to be located in a vessel completely separate from the main storage tank;

Fig. 12 is a view taken along the line 12—12 of Fig. 11 and showing a valve control mechanism adapted for use with the pressure actuated control illustrated in Fig. 11;

Fig. 13 shows a modified form of inlet and outlet arrangement for injecting and removing the volatile liquid from the storage tank;

Fig. 14 is a fragmentary view in plan taken along the line 14—14 of Fig. 13.

Referring now more in detail to the drawings, and first to Figures 1 to 5 thereof, the numeral 1 indicates generally the pressure actuated control for controlling the flow of water into and out of the tank through the inlet and outlet connection 2. Valve means 3 may be provided for stopping the outflow of water in the event its level, that is the level of the interface between the water and the volatile liquid in the tank, should fall to a point closely adjacent and above the inlet and outlet connection 2. The pressure actuated control 1 is connected to the vapor space in the upper portion of the storage tank by means of a vapor conduit 4, and a suitable indicator 5 is provided for indicating on the exterior of the tank at all times the level of the interface between the water and the gasoline in the tank. This indicator is actuated through a cable passing over a pulley suitably located, preferably on the roof of the tank as shown at 6.

The roof of the tank is also provided with the usual pressure relief valve 7, which may incorporate also the feature of opening to permit the inflow of air when the pressure within the vapor space in the tank drops below a predetermined minimum.

The roof of the tank may be provided with a means at 8 for manually employing a gauge whereby the contents of the tank may be gauged, and with a means 9 for measuring stock. These, however, form no part of the present invention.

A safety device for giving the alarm in case of an excessive rise in the level of the liquid in the tank or an excessive drop in the interface level between the heavier and lighter liquids in the tank is provided by an audible signal 10, and the numeral 11 indicates the usual manhole or hatch for providing access to the interior of the tank. It will be understood that this as well as the other fittings on the roof of this tank will be sealed so as to provide a tank with a sealed top.

Provision for the inflow and outflow of the lighter liquid is made by means of an inlet and outlet fitting 12 which will later be described more in detail, and provision for the inlet and outlet of water during the operations of filling or emptying the tank of volatile liquid, is indicated at 13.

A water collector or drain 14 may be employed for catching the water drained from the tank by the compensator apparatus constructed in accordance with this invention, and suitable manual valves should be provided as indicated by the numerals 15, 15¹ and 15a for shutting off flow through any of the liquid lines or conduits entering the tank, whenever such shutoff may be desirable for any reason.

A suitable water supply under pressure is indicated by the numeral 16 as being an elevated water tank, to which water may be supplied by a suitable pump mechanism suitably located as within a pump house 17 at the foot of the support for the elevated tank 16.

The valve 3 may be controlled in any suitable fashion so as to be closed by the dropping of the interface level between the heavier and lighter liquids within the main tank, and is illustrated as being controlled by means of a float 18.

Likewise, the indicator 5 may be controlled in any suitable fashion by a device which will indicate the interface level, but in the instance illustrated is controlled by means of a float 19 adapted to float at the interface level.

Floats 20 and 21 may be provided for closing and opening switches in order to actuate the audible signal 10.

The gasoline or volatile liquid inlet and outlet 12 is in the form of a funnel shaped device connected by means of a conduit 22 to the exterior of the tank and supported by a suitable means such as the brackets 23 from the side wall of the tank. The purpose of making this inlet and outlet fitting of funnel shape is so as to spread out and slow down the velocity of liquid flowing in or out through the fitting, and in order to prevent such liquid from creating turbulence on the surface of the body of volatile liquid in the tank there is provided a baffle 24 horizontally disposed and slightly spaced above the fitting 12. By this arrangement it will be seen that liquid entering the fitting 12 or leaving the fitting 12 will do so at a relatively slow velocity as compared with its velocity through the pipe 22, and that in entering or leaving it will move in a horizontal as distinguished from a vertical direction and hence tend to create as little turbulence as possible within the body of liquid.

Connected to the main inlet and outlet pipes for the lighter and heavier liquids respectively, are pumps 25 and 26 preferably connected together to the same operating device so that they will be operated simultaneously at the same speed. Such a connection is illustrated by the common drive shaft 27. These pumps 25 and 26 are so connected that when one is pumping liquid from the tank the other will be pumping liquid into the tank, and vice versa. Preferably they are as nearly identical as possible so that the one will pump as nearly as possible the same volume of liquid as the other. It is recognized, however, that mechanically and practically it is impossible to maintain two pumps in such fashion that they will pump identically the same quantities of liquid at all times even though operating at the same speed, and as will be hereinafter explained, any differences in the volumes pumped by these two pumps will be compensated for by the hydraulic compensator of this invention.

The compensator consisting of the pressure actuated control and the valve mechanism operated thereby will serve on occasions on which the level of liquid in the tank tends to rise and thus to increase the pressure within the vapor space at the top of the tank, to bleed off water through the fitting 2 and the pipe 28 to the drain or water collector 14; and on occasions on which the level of liquid in the tank tends to fall and thus to decrease the pressure within the vapor space at the top of the tank, to let water flow into the tank through pipe 35 and the fitting 2.

The pressure actuated control is in the instance illustrated mounted within a vessel 1 having a closed top 29. The bottom of this vessel is likewise closed except for openings communicating with two vertically disposed tubular extensions 30 and 31 respectively, which are sealed to corresponding openings in the bottom of the vessel 1 and extend upwardly therefrom a substantial portion of the distance toward the top of the vessel. These are open at their upper ends and obviously provide for communication between the exterior of the vessel and the upper portion of the interior thereof.

Within the vessel there is maintained substantially at a point 32 the upper surface of a body of liquid 33 which liquid may be water from the same source as employed in connection with compensation for varying volumes within the main tank. However, this body of liquid within the compensator is not necessarily connected in any fashion with the body of liquid in the main tank and its level does not vary in accordance with the variations in any level within the main tank. On the contrary, the level of the surface of this body of liquid 33 is maintained at some arbitrarily selected point and is indicated to the operator by a suitable water gauge 34. Suitably, it may be drawn from the water supply pipe 35 by which connection is made to the source of water supply 16. A branch pipe 36 connects the water supply pipe 35 with the bottom of the vessel 1 and flow between this water supply pipe 35 and the vessel 1 is controlled by a manually operated valve 37.

Within the vessel 1 is an inverted cup shaped vessel or bell 38 closed at its upper end and open at its lower end which is disposed beneath the surface of the liquid. This bell is provided with tubular members 39 and 40 extending downwardly from its upper end and adapted to telescopingly engage about the outsides of the tubular members 30 and 31 respectively. About the upper end of the tubular member 40 the upper surface of the bell 38 is reinforced by means of a reinforcing plate 41 to which is secured an anchor 42 whereby the bell is fixedly carried on a cable 43.

The cable 43 passes upwardly and over a pulley or sheave 44 mounted on a fixed axis within the vessel 1, and then downwardly to a point where it is secured to the upper end of a counterweight 45. The counterweight 45 as indicated, is disposed within the opening through the bottom of the vessel 1 which is provided by the tubular members 39 and 30. The other end of the cable 43 passes downwardly from the anchor 42 and around a sheave 46 and thence upwardly to a point where it is secured by means of an adjustable connection 47 to the lower end of the counterweight 45.

The vessel 1 is mounted upon a framework comprising a lower horizontal ring which in this instance is formed of tubular stock as indicated at 48, and a similar upper ring 49 on which the lower end of the vessel 1 rests. The rings 48 and 49 are connected by upright members 50, and suitable bracing 51 serves to work with additional horizontal members 52 to provide a rigid frame structure. The horizontal members 52 also serve as a support for certain parts of the mechanism as will be now described.

A cowling for protective sheathing 53 may be provided for enclosing the frame which supports the vessel 1, for the purpose of protecting the mechanism underneath such vessel.

As will readily be seen in Fig. 5, the vapor conduit 4 from the upper end of the main tank extends through the space between the vessel 1 and up through the bottom of this vessel into the space above the surface 32 of the liquid 33 but within the bell 38. Thus, the interior of this bell will be subjected to the same vapor pressure as that existing above the surface of the body of liquid within the main storage tank. The outer surface of this bell within the space above the liquid in the vessel 1 will, on the other hand, be subjected to the ambient atmospheric pressure due to the fact that this space within the vessel 1 is open to the exterior through the tubular members 30 and 39 and through the tubular members 31 and 40. Since the bell is counterbalanced by the counterweight 45, it will float higher or lower in the liquid 32 as the differential of pressures between that in the upper portion of the main storage tank and the ambient atmospheric pressure fluctuates. During more or less rapid changes in fluctuation of pressure in the vapor space in the top of the main storage tank, the bell 38 will rise and fall in substantially exact proportion to such variations because during such rapid variations there would be such slight changes in the ambient atmospheric pressure that it might be regarded as a constant.

In order that the pressure of the vapor within the vapor space in the main tank might readily be observed directly at all times, there may be provided a pressure gauge 54 connected to the vapor conduit 4, this pressure gauge being preferably located adjacent to the pneumatic-hydraulic compensator shown in Figures 2 to 5, inclusive. Furthermore, in order to drain any possible moisture or condensation from the vapor line 4 there may be provided a suitable drain controlled by a drain cock 55.

For the purpose of draining water from the vessel 1 when desired, there may be provided a drainpipe 56 controlled by a drain cock 57.

With reference now particularly to Figs. 3 and 5, it will be seen that the lower sheave 46 around which the cable 43 extends is mounted on a shaft 58 to rotate therewith. This shaft 58 is the operating shaft for a three-way valve 59 and the shaft carries counterweights 60 so positioned as to hold it normally in a neutral or completely closed position during which no flow may take place through the valve in any direction. This three-way valve is intended to control communication between the water inlet pipe 35 and a pipe 61 leading from the three-way valve through the valve 15a to the auxiliary inlet and outlet water fitting 2, and to alternately connect such pipe 61 with the drainpipe 28 leading to the water drain 14. The details of the three-way valve are no part of this invention and therefore no effort is made to illustrate the interior construction thereof. However, it will be understood that when the pressure in the vapor space above the main tank drops so as to cause the bell 38 to move to a lower position with respect to the surface 32 of the water in the vessel 1, it will rotate the sheave 46 in a counterclockwise direction, and it is intended that such rotation will serve to open communication between the water inlet pipe 35 and the pipe 61 leading to the main tank. This will permit water to flow into the main tank so as to raise the pressure in the vapor space to that for which the device is set. Contrariwise, if the pressure in the vapor space should rise to a value greater than that for which the device is set, this pressure being transmitted through the pipe 4 to the interior of the bell 38 would cause this bell to rise with respect to the level of the water 32 and thereby to cause clockwise rotation of the sheave 46. This clockwise rotation would operate the three-way valve 59 in such a direction as to place the pipe 61 leading to the main tank in communication with the drainpipe 28 so as to permit some of the water to drain out through the fitting 2 and to the drain 14. The draining out of such water would relieve the excessive pressure in the vapor space at the top of the main tank to such an extent that the bell 38 would be permitted to move downwardly again until the valve 59 occupies its neutral or closed position.

In Fig. 6 there is illustrated a modification in which the valves for controlling the compensating flow of water into and out of the tank are actuated electrically. In this arrangement, the vapor conduit 4 from the top of the main tank 62 leads to a compensator in the form of a fluid motor 64 where the pressure of the vapor from the top portion of the main tank acts on a diaphragm or piston to move a switch operating bar 65 up or down. The bar 65 has electrical contacts 66, 67 and 68 thereon, adapted to contact respectively the stationary electrical contacts 69, 70 and 71. These electrical contacts control the power supplied from a source of electrical energy 72 and it will be seen that when the bar 65 moves downwardly, as under the influence of a lowered pressure within the vapor space at the top of the main tank, the contacts 66 and 67 will engage the contacts 69 and 70, respectively, thus closing the circuit to the motor 74 which upon being energized serves to open the valve 75 and permit water to flow in from a suitable source of water supply under pressure connected to the system at 76. This water will then flow through the line 77 and be discharged beneath a horizontal baffle 63 within the bottom of the main tank. It is noted that the entrance 13 for the main pipe which carries water to and from the tank during filling and emptying operations, in this instance employs the same baffle 63, the purpose of this baffle being to spread out the water as it comes into the tank and thereby lower its velocity and cause it to leave the opening of the pipes in a horizontal direction and cause the least possible agitation.

Referring again to the bar 65, when this bar is raised, as by an increase in the pressure in the vapor space at the top of the main tank, the contacts 67 and 68 will engage respectively the contacts 69 and 71, thereby energizing the motor 78 and opening the valve 79 so as to permit water to drain from the main tank through the opening 80.

Except as described, the operation of this modification is the same as that heretofore set forth.

In Fig. 7 is illustrated a modification in which the pressure actuated control and the valves for controlling the supply and drain of water to compensate for fluctuation in pressure in the vapor space, are all mounted within the tank. While in most instances this might not be found satisfactory, it might well be desirable in other instances. The valve arrangement employed with the structure shown in Fig. 7 is illustrated in Fig. 8.

In these figures, a bell shaped gas holder or float 83, preferably cylindrical, with its roof connected through a flexible tube 84 through the roof of the storage tank establishing communication between the inside of the gas holder and the atmosphere, has its lower part built as a float, keeping the gas holder afloat and balanced at a desired level corresponding to the mean differential pressure, between the extremes for which it is set. The vertical displacements of the gas holder are guided by a suitable guiding mechanism such as the cylinder 81 fixed to the roof of the tank or other suitable structure, and having a number of holes 82 therein providing communication between the interior of the cylinder 81 and the vapor space in the top of the tank. A cable 84 is fixed to the gas holder 83 and runs over a pulley or sheave 85 anchored at the bottom of the tank by suitable bearing mounting 86. The other end of the cable passes upwardly from the pulley 85 and is attached to a counterfloat 87.

The shaft 88 on which the pulley 85 is mounted, is threaded through its supporting bearings carried on the brackets 86, so that as it rotates in one direction, it will move axially, and rotation in the opposite direction will move it in the opposite direction axially.

As shown in Fig. 8, the water inlet is through a fitting 89 having a poppet type valve 90 against which the end 91 of the shaft 88 is adapted to bear when this shaft moves endwise in one direction. Movement of the shaft 88 endwise will thus cause the end 91 to push the valve 90 to open position and permit water to flow into the tank through the pipe 89.

Adjacent the other end of the shaft 88 there is disposed the water outlet pipe 92 controlled by a poppet type valve 93 which, in this case, is urged toward closed position at all times by means of a spring 94 which is of such strength as to resist the normal head of liquid against the valve inside the tank. This valve 93 is adapted to be opened when the shaft 88 moves endwise in a direction opposite from the valve 90 so that the end 95 of this shaft bears against the valve 93 and moves it against the tension of the spring 94 to open position to permit water to drain from the tank.

It will be seen that the arrangement in this instance provides for balancing the ambient atmospheric pressure against the pressure existing within the upper end of the tank so that the actuation of the valves 90 and 93, will be in accordance with variations in the differential between the ambient atmospheric pressure and the pressure existing within the top of the tank. In this case the bell 83 will be subjected on its exterior and upper surface to the pressure existing within the top of the tank, and on its interior to the ambient atmospheric pressure and it will be appreciated that the hookup between the cable 84 and pulley 85 and between the pulley shaft 88 and the mounting 86 is such that when the bell 83 moves downwardly at such times as the pressure in the top of the tank may increase above a predetermined maximum over the pressure of the outside air, it will rotate the pulley 85 in such direction as to cause the shaft 88 to move toward the left as seen in Fig. 8 and thereby to unseat the drain valve 93 permitting the water to drain out and relieve the excessive pressure. On the other hand, when the bell 83 tends to rise due to a lowering of the pressure in the upper end of the tank, the pulley 85 will be rotated in such direction as to move the shaft 88 toward the right so that its end 91 will unseat the valve 90 and permit more water to flow into the tank thereby raising the pressure in the top of the tank to the desired extent.

Referring now to Figs. 9 and 10, there is illustrated a modification in which the control mechanism and valves for controlling the compensating flow of water to and from the tank, are located in a separate vessel and not in the main tank. This has the advantage that the control mechanism all operates in a bath of water and is not subjected to the hydrocarbon action as in the case of the forms shown in Figs. 7 and 8. However, certain other modifications are required in order to locate this apparatus in a separate tank connected at its upper and lower ends with the main tank, as will be now described.

In this case the control mechanism is mounted within a vertical cylindrical column 96 in communication with the main tank through the vapor conduit 4 and through the water conduit 97. This cylindrical member 96 will thus contain water to a height balancing the column of both liquids inside the main tank. When the water level inside the main tank varies from the bottom of the tank up to the level of the volatile liquid input and withdrawal fitting, the level in the cylindrical column 96 will vary between a minimum, according to the density of the volatile liquid, and a maximum at the level of the inlet and outlet fitting for the volatile liquid. The bell shaped floating gas holder 102, which is in substance the same as that illustrated in Fig. 7, is guided within a cylindrical ring shaped float 98, which follows the displacements of the water level. Both floats, the ring shaped float 98 and the gas holder 102 are tied by cable to the differential opening mechanism for the water inlet and outlet valves at the bottom of the column 96, the cables 99 and 103 being passed around pulleys 100 and 104 and then upwardly to positions where they are connected to counterfloats, one of which is shown at 101, and the other of which is shown in dotted lines.

The cable 99 of the float 98 will turn the pulley 100. The hub of this pulley is hollow and turns in the bearing 106a without any axial displacement and acts as a nut for the shaft 107 of the pulley 104. A smooth part 105 of the shaft 107 turns in the other bearing 106. As in the description of Fig. 8, the axial displacement of the shaft 107 controls the out and inflowing water valves 90 and 93. Thus, when the shaft 107 moves toward the right as seen in Fig. 10, the end 108 thereof will bear against the valve 90 and open it thus permitting water to enter the tank from the pipe 89. On the other hand, when the shaft 107 moves to the left as seen in Fig. 10, the end 109 thereof will contact and move toward open position the valve 93 thereby permitting water to drain from the tank.

During periods when water is being pumped into and the volatile liquid out, or vice versa, both floats 98 and 102 will move up or down together inside the column 96. Both pulleys 100 and 104 will turn together and there will be no axial displacement of the shaft 107 as long as the vapor pressure in the vapor space at the upper end of the main tank does not change. If, during this period, the pumping rates of water and volatile liquid do not remain exactly equal, a change of the level of the liquid 5 in the main tank will occur, and consequently a change in the pressure in the vapor space at the upper end of this tank will result. Such change in pressure will be impressed upon the exterior of the gas holder 102 and cause it to move downwardly or upwardly with respect to the surface of the liquid in the column 96 and hence with respect to the float 98. This relative displacement of the two floats will cause a difference in the rotation of the pulleys 100 and 104, and consequently will produce an opening of one of the valves 90 or 93 corresponding to the pressure variation resulting from the unequal flow of water and volatile liquid into and out of the main tank.

During periods in which the liquid is merely stored within the main tank, the floats 98 and 102 will float at a determined height in the column 96, and only the gas holder 102 will vary in position according to the relative pressure variations inside the vapor space at the upper end of the main tank. Such variations will occur due to temperature changes and barometric changes which will cause the opening of one of the valves 90 or 93, as the case may be.

Referring now to Figs. 11 and 12, there is shown another modification of a pneumatic-hydraulic compensation according to this invention. Alongside the main tank 62 is a vertical cylindrical column 110, the space within the upper end of which is in communication with the atmosphere through a conduit 112. This vessel contains a suitable liquid such as water up to a predetermined level therein, which level may be checked by a suitable level indicator of conventional construction.

A bell shaped gas holder 111 is provided which is substantially the same as those hereinbefore described, and may be provided with a ring shaped float adjacent its lower end so as to assist it in floating in the liquid in the column 110. This float is preferably so positioned that it will not reach the water level when the gas holder moves up, and will balance the gas holder at its lowest position in order that the top of the gas holder will remain out of water.

A pipe 4 establishes communication between the inside of the gas holder and the vapor space in the top of the main tank 62. Following pressure variations in the top of the main tank, the gas holder 111 will move up or down. This movement will turn the pulley 115 at the bottom of the vessel 110 through the action of the cable 114 which runs from the gas holder 111 down around the pulley 115 having one end fixed to the gas holder and the other to a counterfloat so as to keep the cable 114 at all times tight.

On the shaft 116 of the pulley 115 are two additional pulleys or sprockets 117 and 120 adapted to the control by means of belts or chains 118 and 121 to valves 119 and 122 respectively. The control mechanism is such that there is a neutral time between the closing of one valve and the opening of the other but it will be understood that the rotation of the pulley 115 in one direction will cause the opening of one of the valves 119 and 122 while the other remains closed, and that rotation in the opposite direction will first close the open valve and then after an interval during which both valves will be closed, will serve to open the valve which previously remained closed. One of the valves 119 and 122 controls the inflowing water, coming in, for example, through a pipe 123, while the other valve 122 controls the draining of water through the drainpipe 124. Both of these pipes enter the main tank 62 through a common pipe 61, if desired. In this pipe 61 it is desired that a common valve as indicated be employed, but such valve must be left open as long as the device as an entirety is functioning.

During periods of storage when there is substantially no withdrawal or refilling of the tank with volatile liquid, if the pressure in the vapor space in the top of the main tank should drop below a predetermined minimum, the gas holder 111 will move downwardly while the counterfloat attached thereto moves upwardly, making the pulley 115 turn so as to open the valve 119. Water is then let in through the pipe 123 into the main tank 62 bringing the gasoline or other volatile liquid level up so as to increase the pressure in the vapor space to the pressure desired, thus in turn acting on the gas holder 111 which moves up and closes the valve 119. In case of excessive pressure in the vapor space, the gas holder will move up and cause the opening of the valve 122. The reciprocal of the phenomena described above then takes place and water runs out of the tank, whereupon the gasoline level descends in the tank and the pressure in the vapor space goes down. This permits the gas holder to move downwardly causing the closure of the valve 122.

During periods in which the tank is being filled with or emptied of volatile liquid, the difference in the pumping rates of water and volatile liquid may bring about relative pressure differences in the vapor space in the upper end of the main tank. Thereupon, the pneumatic-hydraulic compensator just described annuls these variations by the correction of the pumping differences in letting in the necessary quantity of water to the tank or in permitting the necessary quantity of water to drain out of the tank.

It may be seen from the above that the functioning of the compensator produces, during storage of volatile liquids, a change from pressure variations at constant volume of the vapor space to volume variations at nearly constant pressure in the vapor space, and that during pumping operations as in filling or emptying volatile liquid from the tank, to maintain substantially constant the level of the volatile liquid in the tank. During storage, the changes of volume caused by the system bring about slight changes in the level of the volatile liquid in the tank. These changes, although relatively small, could under some circumstances cause the open end of the volatile liquid inlet and outlet fitting to protrude above the liquid level, and in order to maintain the open end of this fitting always somewhat below the liquid level, a device is used as schematically shown in Figs. 13 and 14.

Referring more in detail to Figs. 13 and 14, the filling and emptying pipe for the volatile liquid is shown at 125 as entering through the sidewall of the tank 62 adjacent the upper end thereof. Within the tank this pipe is connected by a swinging coupling 126 to a swinging section of pipe 127, which is in turn connected by a swinging coupling 128 to a short vertical section of pipe leading to the inlet and outlet fitting 129 carrying the baffle 130 thereabove. Thus, the outlet fitting 129 and the baffle 130 which is carried thereby are able to oscillate in a vertical plane. As previously described, the inlet and outlet fitting 129 is of somewhat cone shaped and is of somewhat less diameter than the baffle 130. Suitable securing elements are secured to both baffles to maintain the distance between them. The effect of these members 129 and 130 is a lessening of the velocity of the pumped liquid flowing into or out of the tank and the arrangement makes it possible for the device to remove substantially the last portions of the volatile liquid when emptying the tank without a premature carrying away of the vapors from the vapor space.

In order to maintain this inlet and outlet for the volatile liquid in a substantially constant position in relation to the liquid level, it is secured to a pair of floats 131 so that it will be suspended by such floats just slightly below the surface of the liquid.

It will be appreciated that there may be used in connection with this invention all known safety devices or devices for facilitating the operation and that various equivalents may be employed for the various portions of the present invention all within the spirit and scope of the invention as set forth in the appended claims.

It will further be appreciated that certain embodiments of the invention have been shown and described by which all of the objects and advantages sought by the invention may be attained.

The invention having been described, what is claimed is:

1. In combination with a closed storage tank, a pair of conduits communicating between the exterior and the interior of the tank and having their interior termini on different levels with the higher terminus spaced from the tank top to leave a vapor space and the lower terminus at bottom level, whereby liquids may be fed into and drained from the tank below said vapor space, the higher of said termini being flared and having its terminating rim disposed generally in a substantially horizontal plane to provide a low velocity discharge and intake, and a baffle spaced above said rim and below the top of said tank and overlying said terminus to deflect the discharge therefrom to a substantially horizontal direction, said baffle preventing the formation of a vortex at the higher terminus when draining liquid from the tank through the higher terminus, and pressure responsive volume control means exposed to the pressure within said vapor space to vary its volume in response to changes in its pressure to maintain the pressure therein within predetermined limits, by causing inflow and outflow of liquid through the bottom terminus.

2. In combination, a closed top tank adapted for storage of a volatile liquid with a vapor space over the volatile liquid, a heavier liquid supply conduit to said tank, a heavier liquid discharge conduit from said tank, valves in each of said supply and discharge conduits, a bell float within said tank, an actuating mechanism for said valves adapted to close one and open the other and vice versa, a mechanical connection between the actuating mechanism and said float, said float having inner and outer pressure surfaces against which pressures can be applied to vary the level at which said float floats in said tank and means exposing one pressure surface to the ambient atmosphere external of said tank, the other pressure surface being exposed to the vapor space in said tank.

3. In combination, a first closed top tank adapted for storage of a volatile liquid with a vapor space above the volatile liquid, a second tank, a conduit connecting between said tanks, first and second floats in said second tank, said second float being of the bell type having inner and outer pressure surfaces against which pressures can be applied to vary the level of the second float, a vapor conduit connected to said first tank above the liquid level therein and communicating with one pressure surface of said second float and means placing the other pressure surface of said second float in communication with the ambient atmosphere external of said first tank, supply conduit means connecting one of said tanks to a source of heavier liquid, discharge conduit means connected to one of said tanks at a lower level therein, valve means in said supply and discharge conduit means, and a mechanical connection between said floats and said valve means comprising a differential mechanism including two movable elements, one element connected to said first float and the other to said second float, a connection between said elements and said valve means such that substantial vertical movement of one of the floats with respect to the other opens and closes the valve means and simultaneous movement of both floats in the same vertical direction neither opens nor closes the valve means.

4. In combination with a closed top tank adapted for storage of a volatile liquid floating on a heavier liquid and with a vapor space thereabove, correlated filling and emptying means for simultaneously injecting into said tank such volatile liquid and withdrawing therefrom in approximately equal amounts such heavier liquid, and vice versa, and separate means for injecting and withdrawing supplemental amounts of heavier liquid responsive to pressure variations in said vapor space comprising conduit means separate from said correlated filling and emptying means connecting a supply of heavier liquid to said tank and providing for withdrawal of heavier liquid from the tank, valve means controlling flow through said conduit means, a bell float adapted to float on a liquid and having interior and exterior pressure surfaces against which pressures can be applied to change the level of said float, means placing one pressure surface in communication with the vapor space in said tank, means placing the other pressure surface in communication with the ambient atmosphere external of said tank, and a mechanical connection between said float and said valve means whereby a change in pressure in said vapor space relative to that of said atmosphere will cause said float to change its level thereby opening and closing said valve means to cause feeding and withdrawal of supplemental amounts of said heavier liquid for maintaining the pressure in said vapor space within predetermined limits.

5. In combination with a closed storage tank having a vapor space above the liquid, two conduits communicating between the exterior and the interior of the tank, the one for feeding and draining a volatile liquid having its terminus slightly below the volatile liquid level, and the other for feeding and draining a heavier liquid having its terminus slightly above the tank bottom, both termini being flared and having their terminating rim disposed in a horizontal plane, the higher terminus having a horizontal baffle spaced above said rim, to secure a substantially horizontal flow of liquid at a reduced velocity and prevent the formation of a vortex upon outflow of fluid from the tank, and pressure responsive control means connected to said vapor space to vary its volume in response to changes in pressure, to maintain the pressure therein within predetermined limits by causing inflow and outflow of heavier liquid through the lower terminus.

6. In combination with a closed top tank adapted for storage of a volatile liquid floating on a heavier liquid and with a vapor space thereabove, correlated filling and emptying means for simultaneously injecting into said tank such volatile liquid and withdrawing therefrom in approximately equal amounts such heavier liquid, and vice versa, and a pressure responsive volume control located externally of said tank and exposed to the pressure within such vapor space to vary the volume of such vapor space in response to changes in its pressure to maintain the pressure therein within predetermined limits.

7. The combination set forth in claim 6 in which said volume control comprises a supply of the heavier liquid, a supplemental liquid feed and withdrawal means connected to said supply for feeding and withdrawing supplemental amounts of said heavier liquid from the tank, and a pressure responsive control exposed to the pressure in such vapor space and connected to said liquid feed and withdrawal means to vary the volume of said vapor space in response to changes in its pressure by causing the feeding and withdrawal of supplemental amounts of said heavier liquid and thereby maintain the pressure in said gas space within predetermined limits.

8. In combination with a closed top tank adapted for storage of a volatile liquid floating on a heavier liquid and with a vapor space thereabove, correlated filling and emptying means for simultaneously injecting such volatile liquid into the tank through a first conduit and withdrawing heavier liquids therefrom in approximately equal amounts through a second conduit, and vice versa, separate means for injecting and withdrawing supplemental amounts of such heavier liquid through a third conduit and means responsive to pressure differential between the pressure in the vapor space and ambient atmospheric pressure controlling said separate means and compensating for any difference in pressure in the vapor space due to unequal amounts of liquid being passed through the correlated filling and emptying means by controlling the injecting and withdrawing of supplemental amounts of heavier liquid.

9. In combination with a closed top tank adapted for storage of a volatile liquid floating on a heavier liquid and with a vapor space thereabove, correlated filling and emptying means for simultaneously injecting such volatile liquid into the tank through a first conduit and withdrawing heavier liquids therefrom in approximately equal amounts through a second conduit, and vice versa, and separate means for injecting and withdrawing supplemental amounts of such heavier liquid comprising a third conduit, a separate heavier liquid injecting and withdrawing means connected to the tank by the third conduit, and a pressure responsive control operable in response to differential between the pressure in the vapor space and ambient atmospheric pressure to control said separate heavier liquid injecting and withdrawing means and compensate for any difference in pressure in the vapor space due to unequal amounts of liquid being passed through the correlated filling and emptying means by feeding supplemental heavier liquid into the tank when the pressure in the vapor space is less than ambient atmospheric pressure by a predetermined amount and by withdrawing heavier liquid from the tank when the pressure in the vapor space is greater than ambient atmospheric pressure by a predetermined amount.

10. The combination of claim 9 wherein said first conduit has its terminus flared and located slightly below the volatile liquid level, and wherein a horizontal baffle is spaced immediately above said terminus and prevents the formation of a vortex at the terminus of the first conduit when withdrawing volatile liquid from the tank.

11. The method of transferring volatile liquids in a system including a closed top tank containing a quantity of the volatile liquid and a quantity of a heavier liquid immiscible therewith sufficient to leave a vapor space above the liquid level in the tank comprising injecting one of said liquids into the tank while concurrently withdrawing approximately an equal amount of the other of said liquids from the tank and maintaining the pressure in the vapor space within predetermined limits by injecting or withdrawing additional quantities of the heavier liquid.

12. In combination with a closed storage tank having a vapor space above the liquid, two conduits communicating between the exterior and the interior of the tank, the one for feeding and draining a volatile liquid having its terminus slightly below the volatile liquid level, and the other for feeding and draining a heavier liquid having its terminus slightly above the tank bottom, both termini being flared and having their terminating rim disposed in a horizontal plane, the higher terminus having a horizontal baffle spaced above said rim, to secure a substantially horizontal flow of liquid at a reduced velocity, said conduit having the higher terminus including a swinging coupling to permit a portion of said conduit to swing thereabout and thereby have the terminus thereof raised and lowered, a second swinging coupling in said conduit having the higher terminus permitting said terminus to change its annular disposition with respect to the portion of the conduit between said swinging couplings, a float connected to said higher terminus so that the latter at all times occupies a position slightly below the surface of said volatile liquid, and pressure responsive control means connected to said vapor space to vary its volume in response to changes in pressure, to maintain the pressure therein within predetermined limits causing inflow and outflow of heavier liquid through the lower terminus.

References Cited in the file of this patent

UNITED STATES PATENTS

| | | |
|---|---|---|
| 1,286,970 | Farr | Dec. 10, 1918 |
| 1,608,365 | Bregeat | Nov. 23, 1926 |
| 1,823,256 | Clark | Sept. 15, 1931 |
| 2,000,583 | Doughty | May 7, 1935 |
| 2,321,976 | Black | June 15, 1943 |

FOREIGN PATENTS

| | | |
|---|---|---|
| 393,991 | Germany | Apr. 19, 1924 |
| 291,843 | Great Britain | June 5, 1928 |